US010841825B2

(12) United States Patent
Chen et al.

(10) Patent No.: US 10,841,825 B2
(45) Date of Patent: Nov. 17, 2020

(54) METHODS AND APPARATUS FOR RRM MEASUREMENT AND REPORTING MECHANISM

(71) Applicant: MEDIATEK SINGAPORE PTE. LTD., Singapore (SG)

(72) Inventors: Tao Chen, Beijing (CN); Pei-Kai Liao, Hsin-Chu (TW); Min Wu, Hsin-Chu (TW)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 0 days.

(21) Appl. No.: 16/091,007

(22) PCT Filed: May 15, 2018

(86) PCT No.: PCT/CN2018/086880
§ 371 (c)(1),
(2) Date: Oct. 3, 2018

(87) PCT Pub. No.: WO2018/210234
PCT Pub. Date: Nov. 22, 2018

(65) Prior Publication Data
US 2020/0068420 A1  Feb. 27, 2020

(30) Foreign Application Priority Data
May 15, 2017 (WO) ................ PCT/CN2017/084345

(51) Int. Cl.
*H04W 36/00* (2009.01)
*H04W 24/10* (2009.01)
*H04W 16/14* (2009.01)

(52) U.S. Cl.
CPC ....... *H04W 24/10* (2013.01); *H04W 36/0085* (2018.08); *H04W 16/14* (2013.01)

(58) Field of Classification Search
CPC .......................... H04W 24/10; H04W 36/0085
See application file for complete search history.

(56) References Cited

U.S. PATENT DOCUMENTS

| 9,544,794 B2 | 1/2017 | Kim et al. |
| 2017/0094624 A1 | 3/2017 | Balachandran et al. |
| 2017/0318490 A1 | 11/2017 | Yang et al. |
| 2018/0124771 A1* | 5/2018 | Mok ............... H04W 36/32 |

(Continued)

FOREIGN PATENT DOCUMENTS

| CN | 104581840 A | 4/2015 |
| CN | 104581841 A | 4/2015 |

(Continued)

*Primary Examiner* — Chi Ho A Lee
(74) *Attorney, Agent, or Firm* — Oblon, McClelland, Maier & Neustadt, L.L.P.

(57) ABSTRACT

Aspects of the disclosure provide a method for radio resource management (RRM) measurement. A measurement configuration can be received at a user equipment (UE) from a base station (BS) in a beam-formed system. The measurement configuration indicates a measurement of a neighbor cell to be performed based on a synchronization signal block (SS block) timing relationship between the neighbor cell and a known cell. The known cell is a serving cell of the UE, or a second neighbor cell of the UE. Beam measurement results of the neighbor cell are reported using SS block indexes of the known cell.

22 Claims, 8 Drawing Sheets

(56) References Cited

U.S. PATENT DOCUMENTS

| | | | |
|---|---|---|---|
| 2018/0302819 A1* | 10/2018 | Lee | H04B 7/0632 |
| 2018/0324022 A1* | 11/2018 | Sheng | H04L 1/1614 |
| 2018/0324721 A1* | 11/2018 | Hakola | H04L 5/0053 |
| 2019/0190062 A1* | 6/2019 | Harayama | H01M 2/168 |
| 2020/0008092 A1* | 1/2020 | Geng | H04W 36/0085 |
| 2020/0022010 A1* | 1/2020 | Kim | H04W 16/14 |
| 2020/0037260 A1* | 1/2020 | Fu | H04L 27/2646 |
| 2020/0037385 A1* | 1/2020 | Park | H04W 76/18 |

FOREIGN PATENT DOCUMENTS

| | | |
|---|---|---|
| WO | WO 2015/044078 A1 | 4/2015 |
| WO | WO 2016/072765 A2 | 5/2016 |
| WO | WO 2016/203290 A1 | 12/2016 |

* cited by examiner

| CASES | SUBCARRIER SPACING (kHz) | FIRST SYMBOL INDEXES IN A HALF FRAME WINDOW | f<=3 GHz | 3 GHz<f<=6 GHz | 6 GHz < f |
|---|---|---|---|---|---|
| A | 15 | {2,8} + 14n | n = 0,1 | n = 0,1,2,3 | |
| B | 30 | {4,8,16,20}+28n | n = 0 | n = 0,1 | |
| C | 30 | {2,8} + 14n | n = 0,1 | n = 0,1,2,3 | |
| D | 120 | {4,8,16,20}+ 28n | | | n = 0, 1, 2, 3, 5, 6, 7, 8, 10, 11, 12, 13, 15, 16, 17, 18 |
| E | 240 | {8, 12, 16, 20, 32, 36, 40, 44} + 56n | | | n = 0, 1, 2, 3, 5, 6, 7, 8, |

METHODS AND APPARATUS FOR RRM MEASUREMENT AND REPORTING MECHANISM

CROSS REFERENCE TO RELATED APPLICATIONS

This present disclosure claims the benefit of International Application No. PCT/CN2017/084345, "Methods and Apparatus for RRM Measurement and Reporting Mechanism" filed on May 15, 2017 which is incorporated herein by reference in its entirety.

FIELD OF INVENTION

The present disclosure relates generally to wireless communication, and, more particularly, to radio resource management (RRM) measurement techniques in a beam-formed system.

BACKGROUND OF THE INVENTION

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In 5th generation (5G) wireless communication system, different numerologies can be configured to support different types of services for efficient transmission. For example, the ultra-reliable low latency communications (URLLC) may use a larger subcarrier spacing with a shorter symbol length in order to achieve a low-latency data transmission, whereas the massive machine-type communications (mMTC) may use a smaller subcarrier spacing with a longer symbol length such that a coverage extension can be achieved by concentrating transmission power at a narrower channel bandwidth. Corresponding to different numerologies and different frequency bands, different configurations of synchronization signals can be employed.

SUMMARY OF THE INVENTION

Aspects of the disclosure provide a method for radio resource management (RRM) measurement. A measurement configuration can be received at a user equipment (UE) from a base station (BS) in a beam-formed system. The measurement configuration indicates a measurement of a neighbor cell to be performed based on a synchronization signal block (SS block) timing relationship between the neighbor cell and a known cell. The known cell is a serving cell of the UE, or a second neighbor cell of the UE. Beam measurement results of the neighbor cell are reported using SS block indexes of the known cell.

In one embodiment, the measurement configuration indicates that the measurement of the neighbor cell is to be performed based on an SS block timing of the known cell. In one embodiment, the measurement configuration indicates an SS block index offset between the neighbor cell and the known cell. In one embodiment, the measurement configuration indicates that the measurement of the neighbor cell is to be performed based on SS block timings of the known cell, and indicates a set of extended virtual SS block timings derived from the SS block timings of the known cell.

In one embodiment, the measurement configuration indicates that the measurement of the neighbor cell is to be perforated based on a subset of SS block timings of the known cell that are evenly distributed. In one embodiment, the measurement configuration indicates a set of cells including the neighbor cell, measurement of the set of cells being performed based on SS block timings of the known cell. In one embodiment, the measurement configuration indicates a carrier frequency, cells operating on the carrier frequency being measured based on SS block timings of the known cell.

In one embodiment, an SS block of the known cell is decoded to obtain SS block timings of the known cell. In an embodiment, the measurement of the neighbor cell is performed based on SS block signals received from the neighbor cell according to the SS block timing relationship between the neighbor cell and the known cell. The measurement of the neighbor cell can be performed without decoding an SS block of the neighbor cell to obtain SS block timings of the neighbor cell. The measurement of the neighbor cell can be performed based on timings of extended virtual SS blocks of the known cell.

In an embodiment, the beam measurement results is reported using actual SS block indexes and/or extended virtual SS block indexes of the known cell. In an embodiment, the measurement configuration is carried in a radio resource control (RRC) message or included in a system information block (SIB) broadcasted from the BS.

Aspects of the disclosure provide another method for RRM measurement. A measurement configuration can be transmitted from a BS to a UE in a beam-formed system. The measurement configuration indicates a measurement of a neighbor cell to be performed based on an SS block timing relationship between the neighbor cell and a known cell. The known cell can be a serving cell of the UE, or a second neighbor cell of the UE. Beam measurement results of the neighbor cell can be received that are reported using SS block indexes of the known cell.

Aspects of the disclosure further provide a UE. The UE can include processing circuitry configured to receive a measurement configuration from a BS in a beam-formed system. The measurement configuration indicates a measurement of a neighbor cell to be performed based on an SS block timing relationship between the neighbor cell and a known cell. The known cell can be a serving cell of the UE, or a second neighbor cell of the UE. The processing circuitry can be further configured to report beam measurement results of the neighbor cell using SS block indexes of the known cell.

BRIEF DESCRIPTION OF THE DRAWINGS

Various embodiments of this disclosure that are proposed as examples will be described n detail with reference to the following figures, wherein like numerals reference like elements, and wherein.

DETAILED DESCRIPTION

Figure 1:
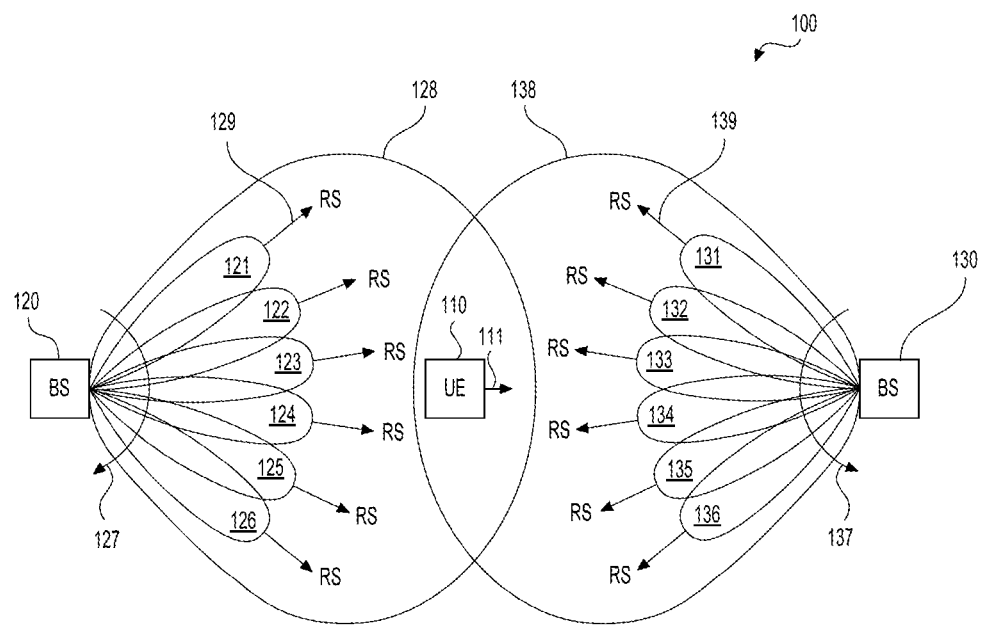
FIG. 1 shows a beam-based wireless communication system according to an embodiment of the disclosure.

FIG. 1 shows a beam-based wireless communication system 100 according to an embodiment of the disclosure. The system 100 can include a user equipment (UE) 110, a first base station (BS) 120, and a second BS 130. The system 100 can employ the 5th generation (5G) technologies developed by the 3rd Generation Partnership Project (3GPP). For example, millimeter Wave (mm-Wave) frequency bands and beamforming technologies can be employed in the system 100. Accordingly, the UE 110, the BSs 120-130 can perform beamformed transmission or reception. In beamformed transmission, wireless signal energy can be focused on a specific direction to cover a target serving region. As a result, an increased antenna transmission (Tx) gain can be achieved in contrast to omnidirectional antenna transmission. Similarly, in beamformed reception, wireless signal energy received from a specific direction can be combined to obtain a higher antenna reception (Rx) gain in contrast to omnidirectional antenna reception. The increased Tx or Rx gain can compensate path loss or penetration loss in mm-Wave signal transmission.

The BS 120 or 130 can be a base station implementing a gNB node as specified in 5G new radio (NR) air interface standards developed by 3GPP. The BS 120 or 130 can be configured to control one or more antenna arrays to form directional Tx or Rx beams for transmitting or receiving wireless signals. In some examples, different sets of antenna arrays are distributed at different locations to cover different serving areas. Each such set of antenna arrays can be referred to as a transmission reception point (TRP).

In FIG. 1 example, the BS 120 can control a TRP to form Tx beams 121-126 to cover a cell 128. The beams 121-126 can be generated towards different directions. The beams 121-126 can be generated simultaneously or in different time intervals in different examples. In one example, the BS 120 is configured to perform a beam sweeping 127 to transmit L1/L2 control channel and/or data channel signals. During the beam sweeping 127, Tx beams 121-126 towards different directions can be successively formed in a time division multiplex (TDM) manner to cover the cell 128. During each time interval for transmission of one of the beams 121-126, a set of L1/L2 control channel data and/or data channel data can be transmitted. The beam sweeping 127 can be performed repeatedly with a certain periodicity. In alternative examples, the beams 121-126 may be generated in a way other than performing a beam sweeping. For example, multiple beams towards different directions may be generated at a same time. In other examples, different from FIG. 1 examples where the beams 121-126 are generated horizontally, the BS 120 can generate beams towards different horizontal or vertical directions. In an example, the maximum number of beams generated from a TRP can be 64.

Each beam 121-126 can be associated with one or more reference signals (RSs) 129, such as channel-state information reference signal (CSI-RS), demodulation reference signal (DMRS), or synchronization signals (SSs) (e.g., primary synchronization signal (PSS), and secondary synchronization signal (SSS)). Those RSs can serve for different purposes depending on related configurations and different scenarios. For example, some RSs can be used as beam identification RSs for purpose of identifying a beam, and/or beam quality measurement RSs for monitoring beam qualities. Each beam 121-126, when transmitted at different occasions, may carry different signals, such as different L1/L2 data or control channels, or different RSs.

The BS 130 can operate in a way similar to the BS 120. For example, the BS 130 can control a TRP to transmit Tx beams 131-136 to cover a cell 138. The BS 130 may transmit the beams 131-136 in a beam sweeping 137 manner, or may form a subset of the beams 131-136 simultaneously. Similarly, each of the beams 131-136 may carry one or more RSs 139. The RSs 139 can be used for identifying a beam, or measuring a quality of a respective beam.

The UE 110 can be a mobile phone, a laptop computer, a vehicle carried mobile communication device, and the like. Similarly, the UE 110 can employ one or more antenna arrays to generate directional Tx or Rx beams for transmitting or receiving wireless signals. In FIG. 1 example, the UE 110 is within the coverage of the cells 128 and 138, however, is connected to the BS 120 and served by the cell 128. Accordingly, the cell 128 is referred to as a serving cell of the UE 110 while the cell 138 is referred to as a neighbor cell of the UE 110. While only one UE 110 is shown in FIG. 1, a plurality of UEs can be distributed within the cells 128 and/or 138, and served by the BS 120 or 130, or other BSs not shown in FIG. 1.

In one example, the UE 110 performs radio resource management (RRM) measurement and report measurement results to its serving cell 128. For example, the UE 110 is moving towards the cell 138 as indicated by an arrow 111 while being connected with the BS 120. The UE 110 may continuously perform the RRM measurement to monitor cell qualities of the cells 128 and 138. When the quality of the cell 138 becomes better than the cell 128, the UE 110 may perform a handover from the cell 128 to the cell 138. For handover purpose, the UE 110 may be configured to monitor beam qualities as well as cell qualities of both the cells 128 and 138. For example, a selection of one of the beams 131-136 at the cell 138 for establishing a connection with the UE 110 can be based on measured beam qualities of the beams 131-136. In addition, a cell quality of a cell can be derived based on qualities of beams belonging to the respective cell.

It is noted that in alternative examples, the UE 110 may have a plurality of neighbor cells, such as 2, 3 or 10 neighbor cells. Accordingly, the UE 110 may perform RRM measurement on multiple neighbor cells. For example, a list of to-be-measured neighbor cells can be configured by the serving BS 120 to the UE 110. Or the UE 110 can measure neighbor cells detected by the UE 110.

In one example, the beams 121-126 of the cell 128 can be identified using synchronization signal blocks (SS blocks) (also referred to as SS/PBCH blocks). For example, a SS block can include SSs (e.g., PSS, SSS) and a physical broadcast channel (PBCH) carried on several consecutive symbols in an orthogonal frequency division multiplexing (OFDM) based system. For example, the BS 120 may periodically perform a beam sweeping to transmit a sequence of SS blocks with each beam corresponding to each SS block. The sequence of SS blocks may each carry an SS block index indicating a timing or location of each SS block among the sequence of SS blocks. Thus, each of the beams 121-126 can be associated with (or corresponding to) such an SS block index.

During an RRM measurement, each of the beams 121-126 can be measured at the UE 110 based on the SSs (e.g., PSS and/or SSS) of the periodically transmitted respective SS block. For example, When the UE 110 reports the measurement results to the BS 120, measurement results of each beam 121-126 can be associated with a respective SS block index. In this way, RRM measurement can be performed and reported based on the SS block indexes. The beam measurement results can include various measurement quantities, such as reference signal received power (RSRP), reference signal received quality (RSRQ), signal to interference plus noise ratio (SINK), and the like.

In one example, in order to facilitate the above SS block based beam measurement, the UE 110 can perform a cell search process to determine SS block transmission timings of the cell 128. For example, during the cell search process, the UE 110 can listen to signals transmitted on a carrier frequency of the cell 128, and receive SSs of an SS block to synchronize to the cell 128. The UE 110 can subsequently decode a demodulation reference signal (DMRS) and/or a PBCH to obtain an SS block index of the SS block. As transmission timings of SS blocks of the cell 128 (e.g., transmission periodicity, locations with respect to radio frames) are preconfigured. By knowing the timing of the decoded SS block, the UE 110 can determine timings of other SS blocks transmitted at the cell 128. This cell search process can be time and power consuming.

According to an aspect of the disclosure, based on SS block timing relationship between the serving cell 128 and the neighbor cell 138, the UE 110 can perform RRM measurement on the beams 131-136 of the neighbor cell 138 without performing a cell search process at the cell 138. For example, based on a measurement configuration received from the BS 120, the UE 110 can know a mapping relationship between SS block timings of the serving cell 128 and SS block timings of the neighbor cell 138. For example, the SS blocks of the neighbor cell 138 can be synchronized and aligned with that of the serving cell 128. Or, the SS blocks of the serving cell 128 and neighbor cell 138 are synchronized but with a known offset. Thus, the UE 110 can derive SS block timings of the neighbor cell 138. Accordingly, beam measurement at the cell 138 can be performed with the derived timing.

In addition, when reporting measurement results of the neighbor cell 138, the UE 110 can use the SS block indexes of the serving cell 128 as basis. For example, measurement results corresponding to a beam 131-136 can be associated with a SS block index of the serving cell 128. For a scenario where the SS blocks of the cell 138 are not aligned with that of the cell 128, a set of extended virtual SS block indexes of the cell 128 can be used for reporting beam measurement results of the cell 138.

Figure 2:
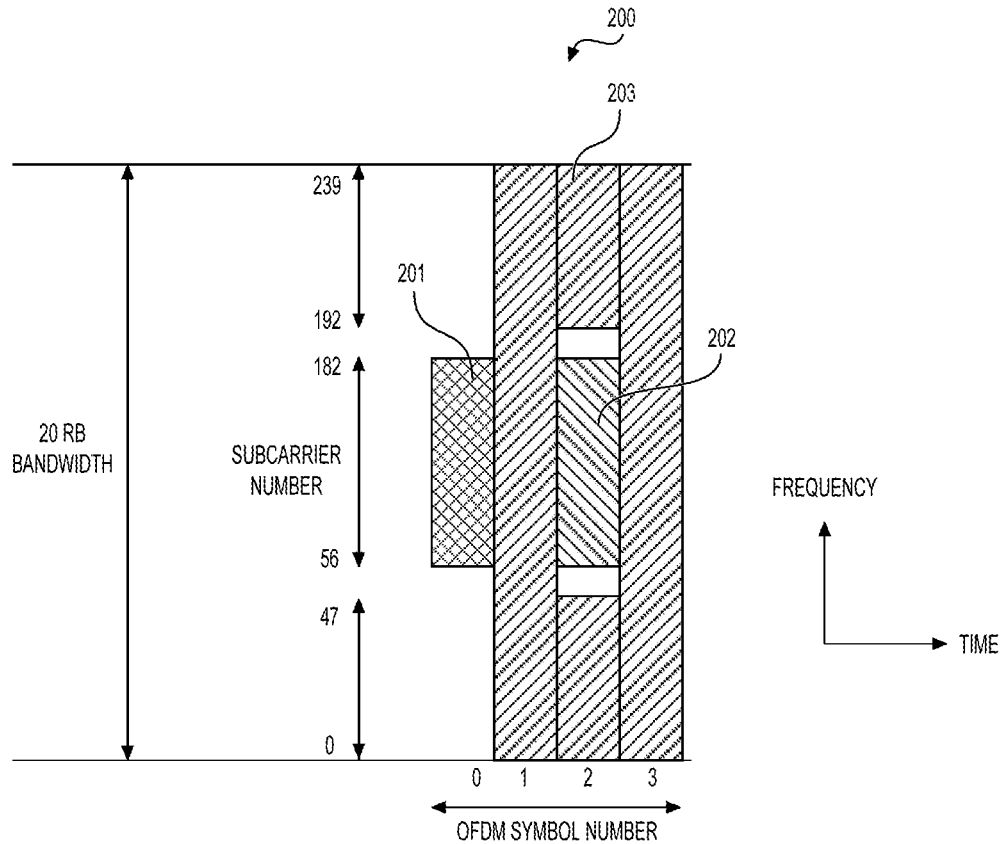
FIG. 2 shows an example of an SS block according to an embodiment of the disclosure.

FIG. 2 shows an example of an SS block 200 used in the system 100 according to an embodiment of the disclosure. The SS block 200 can include a PSS 201, an SSS 202, and a PBCH 203 (represented with shaded areas designated with numbers of 201, 202, and 203). Those signals can be carried in resource elements (REs) on a time-frequency resource grid as shown in FIG. 2. In addition, the SS block 200 can carry DMRSs (not shown) in a subset of REs in the shaded area 203. The REs carrying DMRSs are not used for carrying PBCH signals in one example.

In one example, the SS block 200 can be distributed over 4 OFDM symbols in time domain and occupy a 20 resource block (RB) bandwidth in frequency domain. As shown in FIG. 2, the 4 OFDM symbols are numbered from 0 to 3, while the 20 RB bandwidth includes 240 subcarriers numbered from 0 to 239. Specifically, the PSS 201 can occupy REs at symbol 0 and subcarriers 56-182. The SSS 202 can occupy REs at symbol 2 and subcarriers 56-182. The PBCH 203 can be located at symbols 1-3 occupying 20 RBs at symbols 1 and 3, and 8 RBs (96 subcarriers) at symbol 2.

In one example, the SS block 200 is configured to carry bits of an SS block index by using the DMRSs and the PBCH 203. For example, an SS block index may have a length of 6 bits corresponding to a maximum of 64 beam indexes. A first portion of bits (e.g., 3 least significant bits) may be carried by the DMRSs, and a second portion of bits (e.g., 3 most significant bits) may be carried by the PBCH 203. Thus, by decoding the DMRSs and PBCH 203 of the SS block 200, the UE 110 can obtain the SS block index of the PBCH 203.

Figure 3:
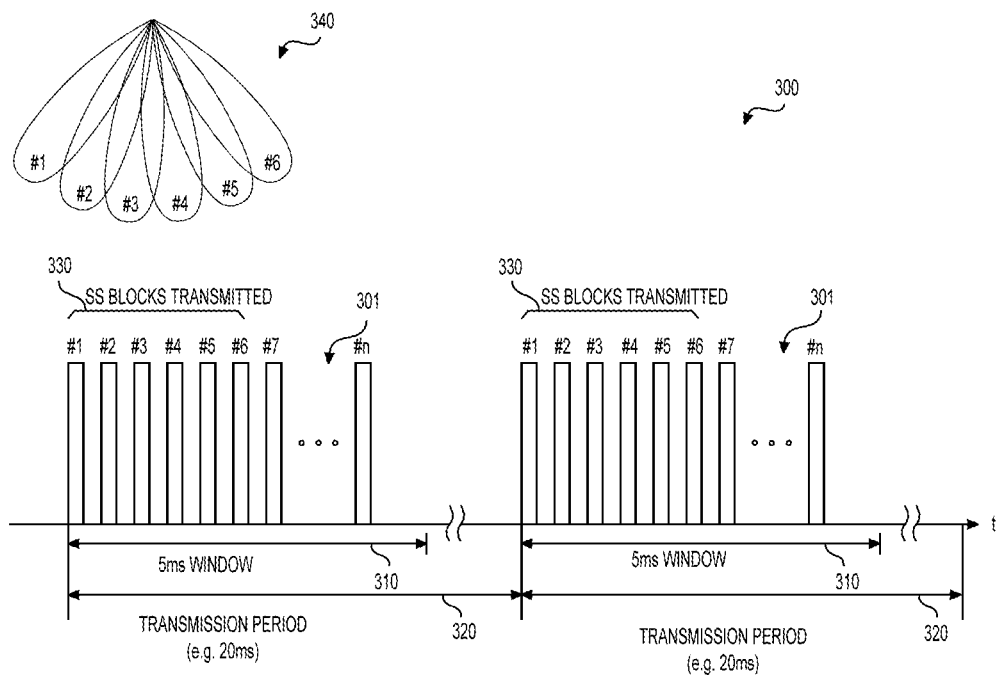
FIG. 3 shows an example SS block transmission configuration according to an embodiment of the disclosure.

FIG. 3 shows an example SS block transmission configuration 300 according to an embodiment of the disclosure. According to the configuration 300, a sequence 301 of SS blocks, referred to as SS block set 301, can be transmitted with a periodicity 320 (e.g., 20 ms) in a sequence of radio frames. The SS block set 301 can be confined within a half frame transmission window 310 (e.g., 5 ms). Each configured SS block can have an SS block index (e.g., from #1 to # n). The SS blocks of the SS block set 301 are configured as candidate SS blocks, but may not be used for actual transmissions of SS blocks.

For example, a cell 340 employs 6 beams from #1 to #6 to cover a serving area and transmits SS blocks based on the configuration 300. Accordingly, only a subset 330 of the SS block set 301 is transmitted. For example, the transmitted SS blocks 330 may include the first six candidate SS blocks of the SS block set 301 each corresponding to one of the beams #1-#6. Resources corresponding to other candidate SS blocks from #7 to # n can be used far transmission of data other than SS blocks.

Although not all candidate SS blocks in a configuration are transmitted, each candidate SS block can still be assigned with an SS block index. The assigned SS block indexes can each correspond to a candidate position or a timing of a candidate SS block in the sequence of radio frames.

In some examples, the UE 110 may perform RRM measurement of the neighbor cell 138 based on SS block timings of the serving cell 128. In a first case, the UE 110 may not have knowledge of actually transmitted SS blocks among candidate SS blocks of the cell 138. Accordingly, the UE 110 may blindly monitor every candidate SS block position for receiving SSs based on the serving cell 128's SS block timings. In a second case, the UE 110 may be aware of timings of actually transmitted SS blocks of the cell 138. For example, a measurement configuration received from the BS 120 carries such information. The UE 110 may accordingly monitor SS block transmission at the timings corresponding to the actually transmitted SS blocks.

Figure 4:
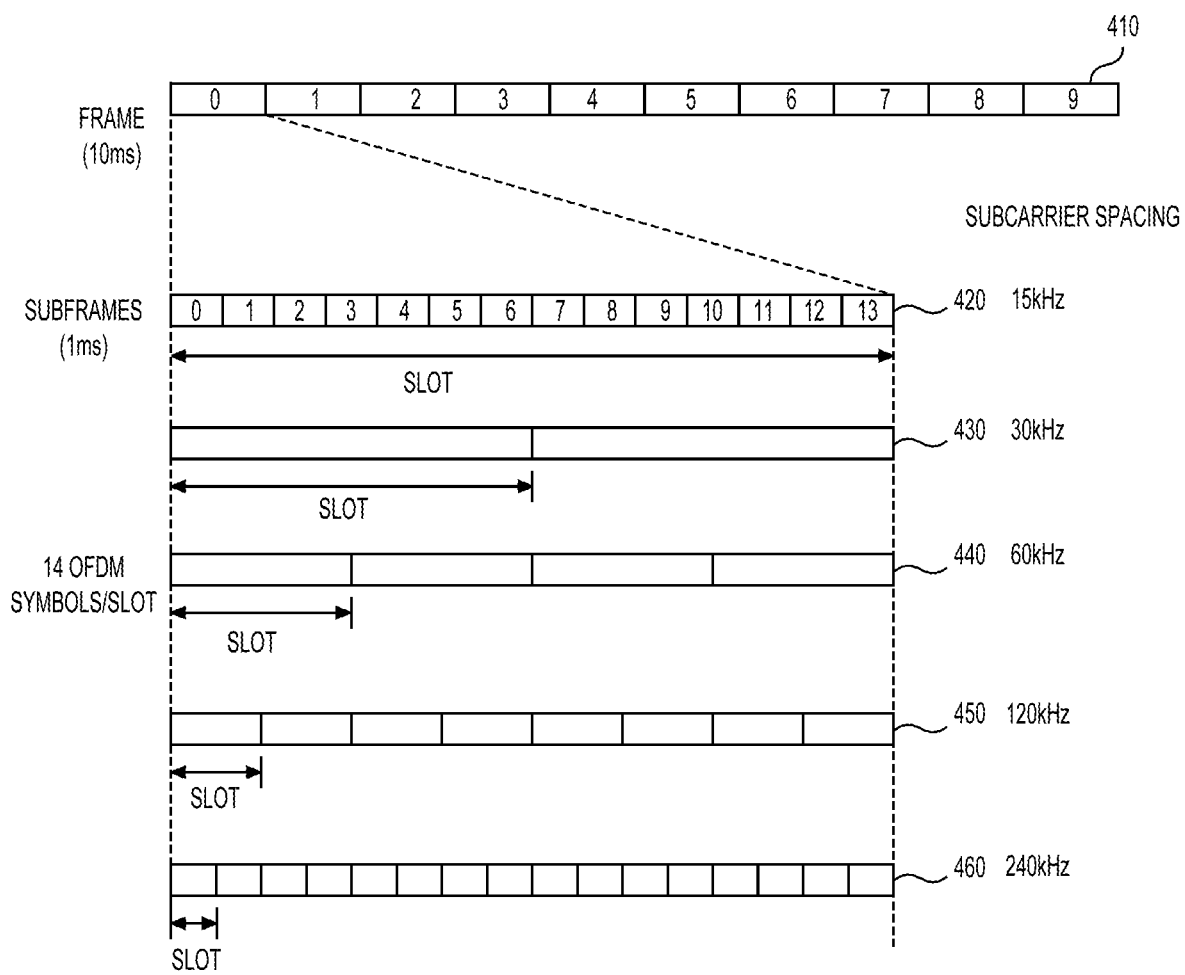
FIG. 4 shows example frame structures corresponding to different subcarrier spacings according to an embodiment of the disclosure.

FIG. 4 shows example frame structures used in the system 100 corresponding to different subcarrier spacings according to an embodiment of the disclosure. A radio frame 410 can last for 10 ms and include 10 subframes that each last for 1 ms. Corresponding to different numerologies and respective subcarrier spacings, a subframe may include different number of slots. For example, for a subcarrier spacing of 15 kHz, 30 kHz, 60 kHz, 120 kHz, or 240 kHz, a respective subframe 420-460 can include 1, 2, 4, 8, or 16 slots, respectively. Each slot may include 14 OFDM symbols in one example.

Figures 5, 6:
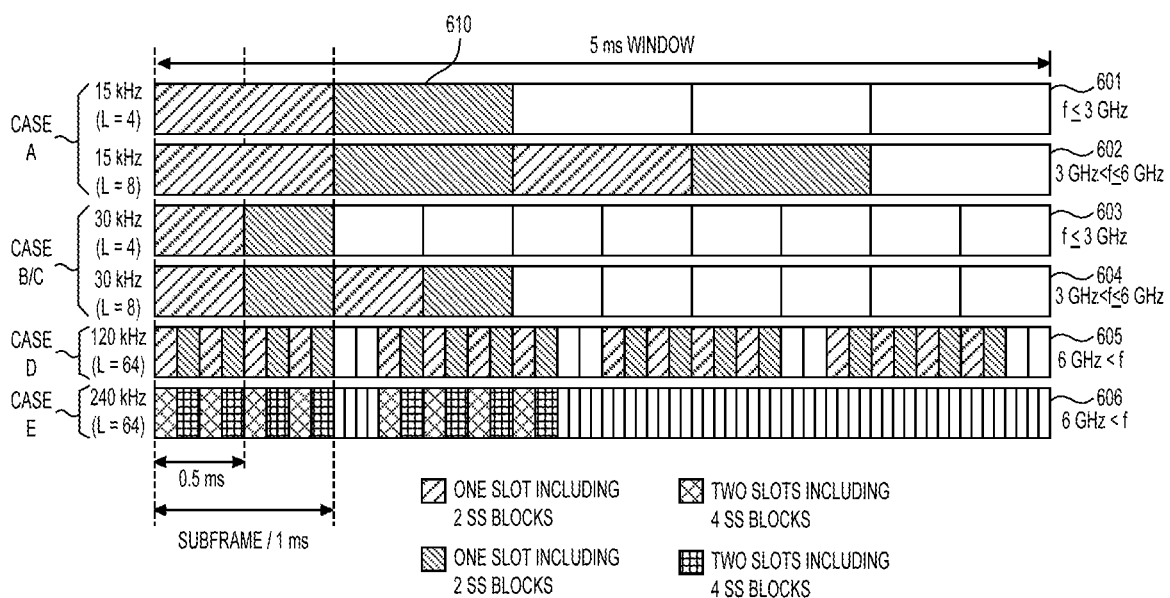
FIG. 5 shows a table including example SS block configurations according to an embodiment of the disclosure.
FIGS. 6-8 illustrate SS block configurations of cases A-E in FIG. 5.

FIG. 5 shows a table 500 including example SS block configurations according to an embodiment of the disclosure. The table 500 shows five cases A-E of SS block configurations in five rows of the table 500. The five cases A-E correspond to different subcarrier spacing configurations of a cell. For each case, indexes of first symbols in each SS block within a half frame (e.g., 5 ms) are specified.

For example, in case A with 15 kHz subcarrier spacing, the first symbols of the candidate SS blocks have symbol indexes of $\{2, 8\}+14n$. For carrier frequencies smaller than or equal to 3 GHz, $n=0, 1$, corresponding to a total number of $L=4$ SS blocks. Accordingly, the 4 candidate SS blocks can have SS block indexes in an ascending order from 0 to 4. For carrier frequencies larger than 3 GHz and smaller than or equal to 6 GHz, $n=0, 1, 2, 3$, corresponding to a total number of $L=8$ candidate SS blocks. Accordingly, the 8 candidate SS blocks can have SS block indexes in an ascending order from 0 to 8.

For another example, in case D with 120 kHz subcarrier spacing, the first symbols of the candidate SS blocks have symbol indexes of $\{4, 8, 16, 20\}+28n$. For carrier frequencies larger than 6 GHz, $n=0, 1, 2, 3, 5, 6, 7, 8, 10, 11, 12, 13, 15, 16, 17, 18$, corresponding to a total number of $L=64$ candidate SS blocks. Accordingly, the 64 candidate SS blocks can have SS block indexes in an ascending order from 0 to 64.

Figure 7:
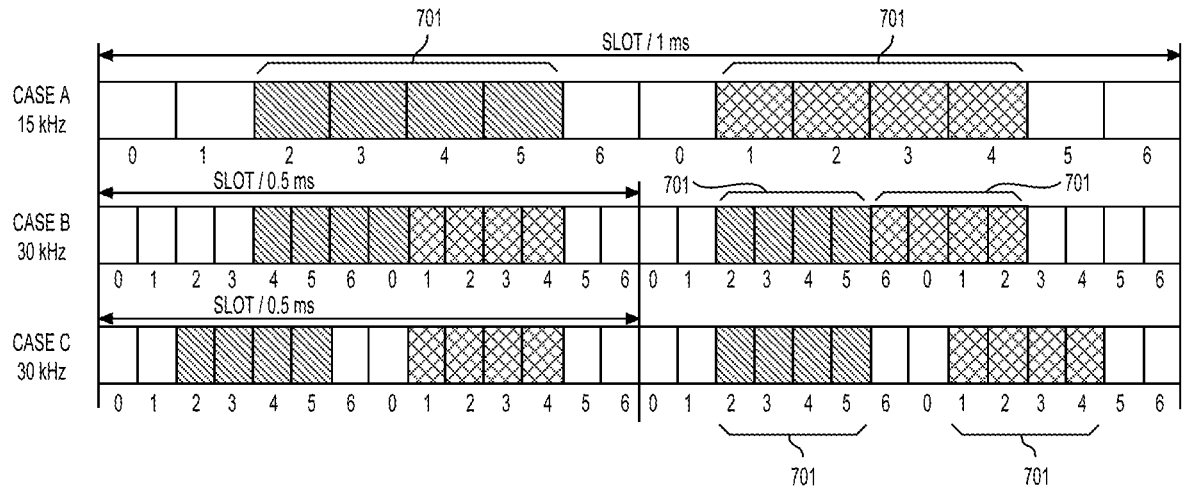
Figure 8:
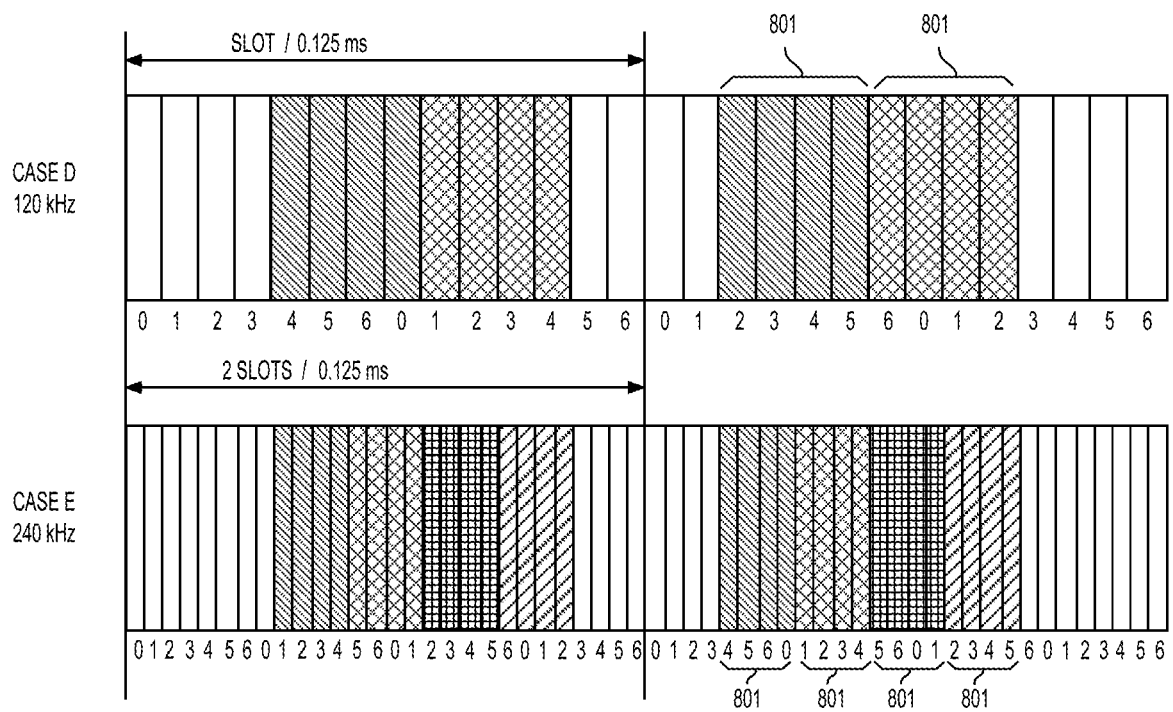

FIGS. 6-8 illustrate the SS block configurations of cases A-F in FIG. 5. Specifically, FIG. 6 shows six SS block configurations 601-606 corresponding to different combinations of subcarrier spacings and frequency bands. In each configuration 601-606, slots containing SS blocks within a half frame window are shown with shaded rectangles 610. FIGS. 7 and 8 show zoomed-in views of how SS blocks 701 or 801 are distributed over sequences of symbols in time domain.

Figure 9:
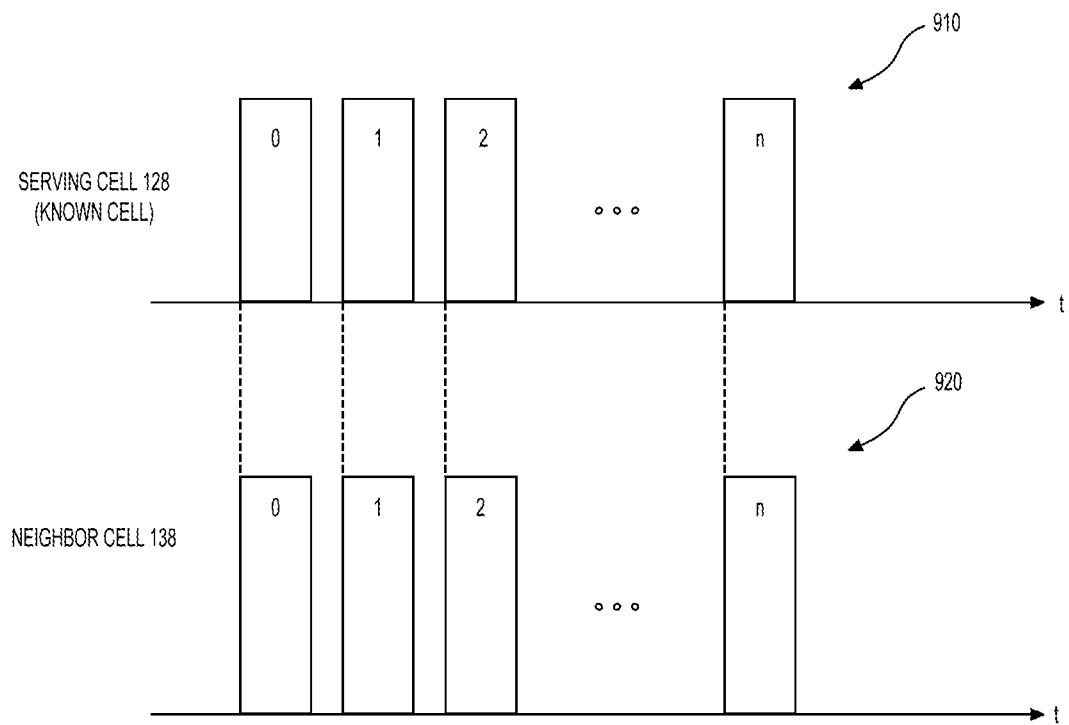
FIG. 9 shows an example of a first scenario of performing RRM measurement based on an SS block timing relationship between two neighboring cells according to an embodiment of the disclosure.

FIG. 9 shows an example of a first scenario of performing RRM measurement based on an SS block timing relationship between two neighboring cells according to an embodiment of the disclosure. The two neighboring cells can be the serving cell 128 and the neighbor cell 138 in the FIG. 1 example. As shown, the serving cell 128 has a first SS block configuration 910, while the neighbor cell 138 has a second SS block configuration 920 the smile as the serving cell 128. The SS block configuration 910 includes a first sequence of candidate SS blocks having SS block indexes from 0 to n. Similarly, the SS block configuration 920 includes a second sequence of candidate SS blocks having SS block indexes from 0 to n. For example, both the first and second SS block configurations 910 and 920 can be the same one of the six SS block configurations 601-606 shown in FIG. 6. In addition, the two sequences of candidate SS blocks of the configuration 910 and 920 are aligned in time with each other. Thus, two SS blocks belonging to the configurations 910 and 920 and having a same SS block index are aligned with each other in time domain. The serving cell 128 and the neighbor cell 138 may operate on a same carrier frequency, or on different carrier frequencies.

Under configuration of FIG. 9, the serving BS 120 in FIG. 1 can configure the UE 110 to perform RRM measurement and report of the neighbor cell 138 based on SS block timings of the serving cell 128. In one example, the serving BS 120 may transmit a measurement configuration to the UE 110 indicating that the UE 110 may use the SS block timing of the serving cell 128 to perform RRM measurement and report of the neighbor cell 138. In one example, the measurement configuration may indicate that the cells 128 and 138 have a same SS block configuration and the candidate SS blocks are aligned.

Based on the measurement configuration, the UE 110 may perform the RRM measurement of the cell 138 using the SS block timings of the cell 128. For example, the UE 110 may receive SSs from the cell 138 based on the SS block timings of the cell 128 during the RRM measurement, and accordingly calculate measurement qualities (e.g., RSRP) based on received SSs. In addition, the UE 110 may report beam measurement results of the cell 138 based on SS block indexes of the cell 128. For example, the beam measurement results of the cell 138 may be associated with the SS block indexes of the cell 138. Alternatively, a set of SS block indexes corresponding beam measurement results may be reported to the BS 120 without providing the respective beam measurement results. For example, in either of the above two cases, the reported beams may be beams having a quality above a threshold, or may be a preconfigured number of beams.

While the SS block timing of the serving cell 128 is used as a basis for RRM measurement of the neighbor cell 138, an SS block timing of a designated cell (other than the serving cell 128) can also be used as a basis for RRM measurement of the neighbor cell 138. For example, the UE 110 may be within coverages of a set of neighbor cells. The BS 120 can transmit a measurement configuration to the UE 110 indicating that the UE 110 can use an SS block timing of one of the set of neighbor cells (the designated cell) as a basis to perform RRM measurement of the neighbor cell 138.

In response to such a measurement configuration received from the BS 120, the UE 110 can perform a cell search process to synchronize to the designated cell, and decode a PBCH and DMRSs of an SS block to determine SS block timings of the designated cell. Based on the known SS block timings of the designated cell, the UE 110 can then perform the RRM measurement and report to the BS 120.

Generally, a serving cell or a designated cell can be referred to as a known cell. SS block timings of a known cell are known to the UE 110 and can be used as a basis for performing RPM measurement and report.

Figure 10A:
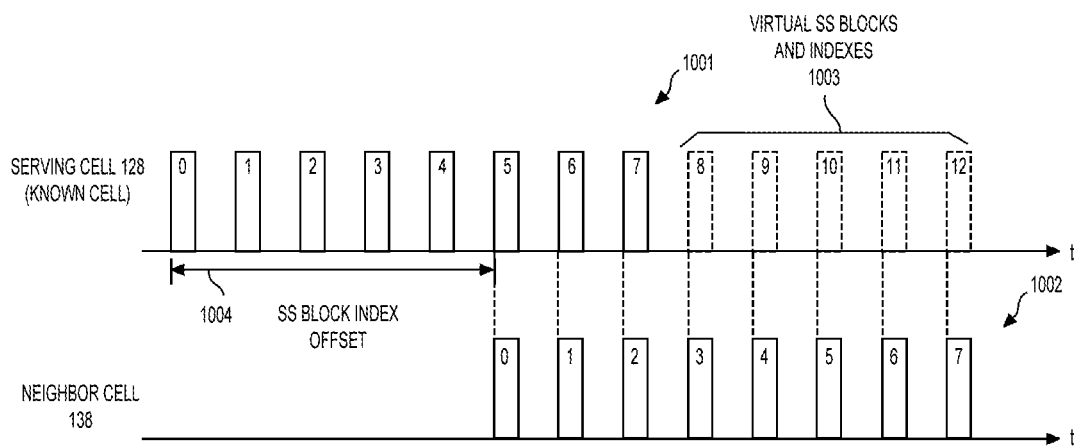
FIGS. 10A-10C show examples of a second scenario of performing RRM measurement based on an SS block timing relationship of two neighboring cells according to an embodiment of the disclosure.
Figure 10B:
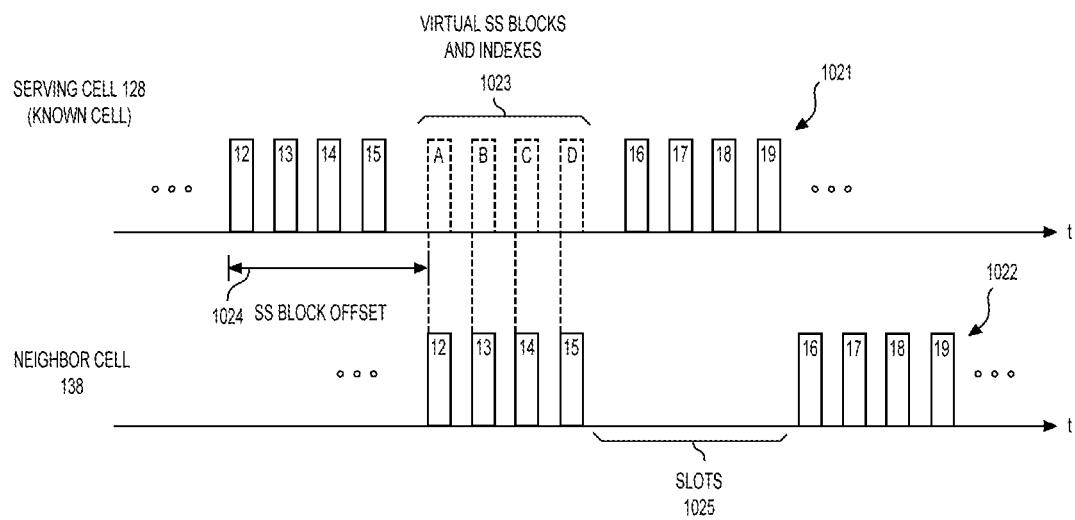
Figure 10C:
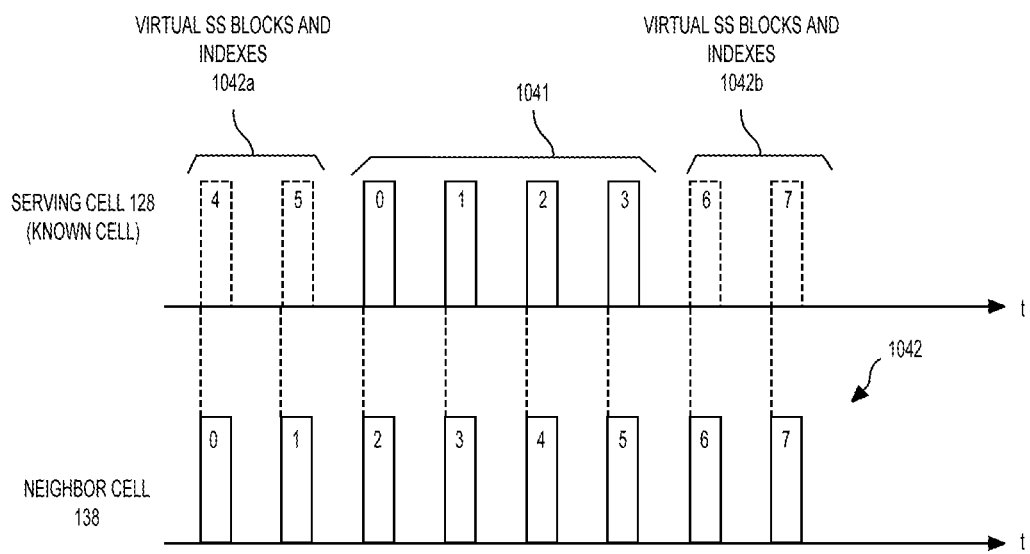

FIGS. 10A-10C show examples of a second scenario of performing RRM measurement based on an SS block timing relationship of two neighboring cells according to an embodiment of the disclosure. In the second scenario, the two neighboring cells have similar SS block configurations. However, the two SS block configurations are not aligned with each other.

In FIG. 10A example, the serving cell 128 (or a known cell) has an SS block configuration 1001 including a sequence of candidate SS blocks with SS block indexes from 0 to 7. The neighbor cell 138 has an SS block configuration 1002 that is the same as the serving cell 128. For example, the SS block configuration 1001 or 1002 can be one of the tour SS block configurations 601-604 in FIG. 6 example.

However, the two sequences of candidate SS blocks are not aligned with each other. For example, there is an SS block index offset 1004 spanning 6 SS blocks. Accordingly, a set 1003 of virtual SS blocks and SS block indexes can be extended from the actual SS blocks and SS block indexes. As a result, the number of SS block indexes can be expanded, for example, from 8 to 14. Those extended virtual SS block indexes (e.g., 8-13) can be used for reporting beam measurements of the neighbor cell 138. While in FIG. 10A example the extended virtual SS block indexes use continuous numbers following the last actual SS block index, any other suitable numbers, in ascending or descending order, consecutive or non-consecutive, can be configured.

In one example, the SS block index offset 1004 can be larger than a total number of the SS blocks of the serving cell 128. Accordingly, the measurement of the neighbor cell 138 can be based on timings of extended virtual SS blocks, and reported using extended virtual SS block indexes.

It is noted that the SS block index offset 1004 can have a negative value or a positive value corresponding to the sequence 1001 being behind or ahead of the sequence 1002. When the SS block index offset 1004 takes a negative value, suitable SS block index values can be used according to a configuration know to the UE 110 and the BS 120. In addition, the serving cell 128 and the neighbor cell 138 may operate on a same carrier frequency, or on different carrier frequencies.

According to the SS block index offset 1004 between the serving cell 128 and the neighbor cell 138, the UE 110 can monitor SSs of the neighbor cell 138 at SS block timings corresponding to SS block indexes from 5-12 to perform RRM measurement. Similarly, when reporting, the extended virtual SS block indexes as well as actual SS block indexes can be associated with respective beam measurement results.

Corresponding to the SS block configurations in FIG. 10A, the BS 120 may transmit a measurement configuration to the UE 110 indicating that there is an SS block index offset between the serving cell 128 and the neighbor cell 138, and the UE 110 can use SS block timings of the serving cell 128 to perform beam measurement of the neighbor cell 138.

FIG. 10B shows another example where an SS block offset 1024 exists between two similar SS block configurations 1021 and 1022. For example, the SS block configurations 1021 and 1022 can be the same as one of the two SS block configurations 605-606. Slots 1025 not containing SS blocks exist among sets of consecutive SS blocks. Accordingly, a set 1023 of virtual SS blocks and respective virtual SS block indexes A-D can be extended from the actual SS blocks and SS block indexes. The extended SS block indexes A-D can be used for beam measurement report of the neighbor cell 138. The serving cell 128 and the neighbor cell 138 may operate on a same carrier frequency, or on different carrier frequencies.

FIG. 10C shows an example where SS blocks of a first SS block configuration 1041 are aligned with a portion of SS blocks of a second SS block configuration 1042. For example, the serving cell 128 (or a known cell) can have the first SS block configuration 1041 corresponding to the configuration 601 in FIG. 6 example, while the neighbor cell 138 can have the second SS block configuration 1042 corresponding to the configuration 602 in FIG. 6 example. Accordingly, the first and second SS block configurations 1041 and 1042 have a same subcarrier spacing (15 kHz) (thus have a same frame/slot structure), however, having different numbers of SS blocks (4 versus 8). Thus, in FIG. 10C, the serving cell 128 and the neighbor cell 138 have different SS block configurations 1041 and 1042, and the SS blocks of the serving cell 128 are aligned with a portion of the SS blocks of the neighbor cell 138.

Under the FIG. 10C configuration, the sequence of SS blocks of the serving cell 128 can be expanded such that the expanded SS blocks (including virtual SS blocks 1042a and 1042b) can have a same number as the SS blocks of the neighbor cell 138. In this way, extended virtual SS block indexes (e.g., 4-7) can be used for reporting beam measurements of the neighbor cell 138.

Corresponding to the FIG. 10C configuration, the BS 120 can transmit a measurement configuration indicating that the UE 110 may use the actual SS block timings of the serving cell 128 and the extended virtual SS block timings derived from the actual SS block timings as basis to perform beam measurement of the neighbor cell. Accordingly, the one or two sets of extended virtual SS block indexes can be used for reporting the measurement. In this way, the UE 110 can know the timings for monitoring the SSs corresponding to the SS block configuration 1042, and the SS block indexes (including the extended SS block indexes) for reporting respective beam measurement results.

In alternative examples, SS block timings of the SS block configuration 1042 may be used as a basis for RRM measurement on SS blocks of the SS block configuration 1041 (assuming the serving cell 128 and the neighbor cell 138 exchange their roles regarding serving cell or neighbor cell). Under such configuration, the BS 130 may indicate to the UE 110 by a measurement configuration that SS block timings of the neighbor cell 138 can be used as the measurement basis without specifying how many SS blocks of the configuration 1041 are to be measured. Such a manner of measurement configuration is similar to that in the FIG. 9 example. Optionally, the BS 130 may specify timings corresponding to the to-be-measured SS blocks of the configuration 1041. The UE 110 can accordingly monitor respective SS blocks at the specified timings.

Figure 11:
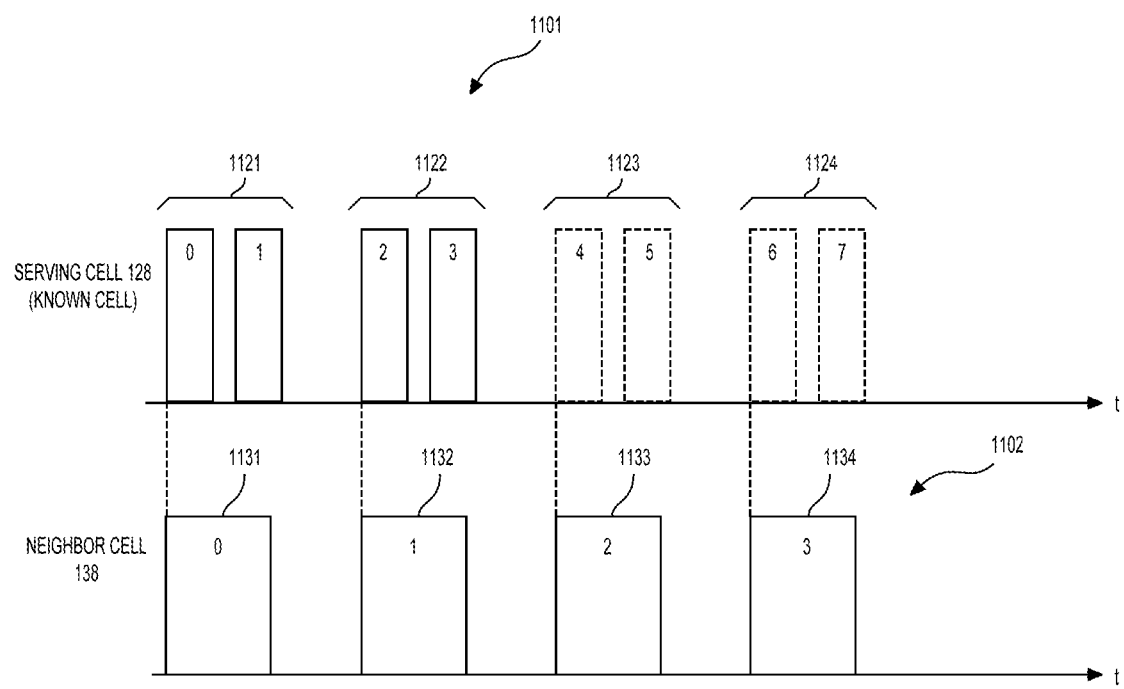
FIG. 11 shows an example where two SS block configurations correspond to different subcarrier spacings.

FIG. 11 shows an example where two SS block configurations 1101 and 1102 correspond to different subcarrier spacings. For example, the serving cell 128 (or a known cell) can have a first SS block configuration 1101 corresponding to the SS block configuration 603 with a larger subcarrier spacing (30 kHz) in FIG. 6 example. The neighbor cell 138 can have a second SS block configuration 1102 corresponding to the SS block configuration 601 with a smaller subcarrier spacing (15 kHz). Accordingly, each SS block of the neighbor cell 138 corresponds (or is aligned) to a set of SS blocks of the serving cell 128. In other words, the SS block timing mapping relationship between the two SS block configurations 1102 and 1101 is one to many. For example, as shown, a first SS block 1131 of the configuration 1102 is aligned with a first set 1121 of SS blocks of the configuration 1101. Similarly, a second SS block 1132 corresponds to a second set 1122 of SS blocks.

To facilitate RRM measurement based on timings of the serving cell 128, an association between an SS block of the neighbor cell 138 and an SS block index of a respective set of SS blocks of the serving cell 128 can be configured. For example, the SS block 1131 can be associated with the first SS block index of the set 1121 of the SS blocks. Thus, beam measurement results of the neighbor cell 138 can be reported using SS block indexes that are determined based on this association configuration. Additionally, the above described SS block expansion technique can be used to expand the SS block indexes of the configuration 1101 to obtain extended virtual SS blocks 1123-1124 and respective extended SS block indexes (e.g., 4-7).

Corresponding to the FIG. 11 configuration, the BS 120 can transmit a measurement configuration to the UE 110 indicating that the UE 110 may perform RRM measurement based on timings of a subset of SS blocks of the serving cell 128 that are evenly distributed in time, and report beam measurement results using respective SS block indexes. In addition, a set of extended virtual SS block indexes (e.g., the indexes 4-7) may be specified.

Figure 12:
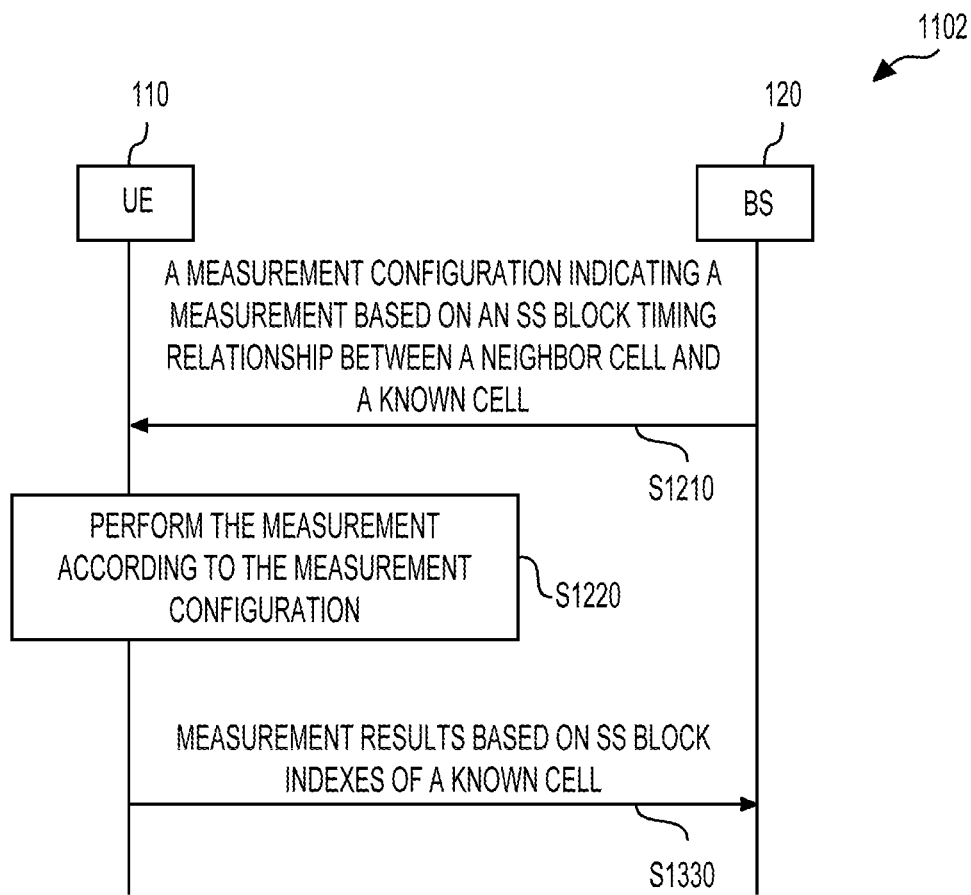
FIG. 12 shows an example RRM measurement process according to embodiments of the disclosure.

FIG. 12 shows an example RRM measurement process 1200 according to embodiments of the disclosure. During the process 1200, the UE 110 is configured to measure beam qualities and cell qualities of a serving cell and neighbor cells, and report measurement results to the BS 120. The measurement can be based on SSs carried in SS blocks. For example, the measurement results can be used for handover operations.

At S1210, the BS 120 can transmit a measurement configuration to the UE 110. In one example, the measurement configuration is carried in a radio resource control (RRC) message. In one example, the measurement configuration is included in system information block (SIB) that is broadcasted from the BS 120. The measurement configuration can indicate a measurement to be performed based on an SS block timing relationship between a neighbor cell and a known cell. A known cell can be the serving cell of the UE 110 (e.g., the serving cell 128 in FIG. 1), or one of the neighbor cells of the UE 110.

In one example, the measurement configuration may indicate a set of neighbor cells that is to be measured based on an SS block timing of a known cell. In one example, the measurement configuration may indicate multiple sets of neighbor cells each assigned with a different known cell. For example, neighbor cells belonging to a same set may have similar SS block configurations. Different sets of neighbor cells use different SS block timing bases can be more efficient. Accordingly, each set of neighbor cells can be measured using an SS block timing of the respective assigned known cell. In one example, the measurement configuration may indicate a carrier frequency, and cells operating on this carrier frequency are to be measured based on an SS block timing of a known cell. In one example, the measurement configuration may indicate a frequency band, and cells operating on this frequency band are to be measured based on an SS block timing of a known cell.

In addition to indicating a known cell for a to-be-measured neighbor cell, the measurement configuration may provide additional information according to SS block timing relationship between the known cell and the respective neighbor cell. As described above in the examples of FIGS. 9, 10A, 10B, 10C, 11, there can be different scenarios regarding SS block timing relationships between a known cell and a neighbor cell. Accordingly, the measurement configuration may include suitable information corresponding to the following different scenarios.

Scenario 1: Corresponding to SS block configurations in FIG. 9 example, the measurement configuration may indicate that the measurement of the neighbor cell is to be performed and reported based on an SS block timing of the known cell.

Scenario 2: Corresponding to SS block configurations in FIGS. 10A-10B, the measurement configuration may indicate that the measurement of the neighbor cell is to be performed and reported based on an SS block timing of the known cell, and an SS block index offset exists between the neighbor cell and the known cell.

Scenario 3: Corresponding to SS block configurations in FIG. 10C, the measurement configuration may indicate that the measurement of the neighbor cell is to be performed and reported based on an SS block timing of the known cell, and further indicate extended virtual SS block timings derived from the actual SS block timings to be used for performing the measurement.

Scenario 4: Corresponding to SS block configurations in FIG. 11, the measurement configuration may indicate that the measurement of the neighbor cell is to be performed and reported based on an SS block timing of the known cell, and a subset of SS block timings of the known cell that are evenly distributed is to be used for performing the measurement. Additionally, the subset of SS block timings of the known cell may include extended virtual SS block timings corresponding to extended virtual SS blocks.

In various examples, the measurement configuration may additionally include other information suitable for conducting the measurement. For example, the measurement configuration may include one or more of the following parameters: measurement objects, reporting configurations, measurement identities, quantity configurations, measurement gaps, and the like.

For example, the measurement objects may provide a list of objects (cells) on which the UE shall perform the measurement. A measurement object can be associated with a carrier frequency. Intra-frequency or inter-frequency measurements can accordingly be performed. The reporting configurations may provide a list of reporting configurations. One or more reporting configurations may be specified for each cell. A reporting configuration may specify a reporting criterion that triggers the UE 110 to send a measurement report. The triggers can either be periodical or a single event description. A reporting configuration may also specify an RS type (e.g., SS/PBCH block or CSI-RS) that the UE 110 uses for beam and cell measurement results. A reporting configuration may further specify a reporting format. For example, the format can include quantities per cell and per beam that the UE 110 includes in the measurement report (e.g., RSRP/RSRQ/SINR) and other associated information such as a maximum number of cells and/or beams per cell to report.

At S1220, the UE 110 performs the measurement according to the measurement configuration. For example, the RRC message is received at an RRC layer of the UE 110. The RRC layer interprets the RRC message, and accordingly commands a physical layer of the UE 110 to perform physical layer measurement and report respective measurement results to the RRC layer.

For example, based on the indication of a known cell for measurement of a neighbor cell and additional information indicating the timing relationship between the known cell and the neighbor cell, the UE 110 may determine timings for monitoring SSs of the neighbor cell, and accordingly receives respective SSs of the neighbor cell to obtain measurement results corresponding to the respective timings. The determined timings may correspond to actual SS blocks of the known cell or extended virtual SS blocks of the known cell. Accordingly, the measurement results can be associated with actual SS block indexes or virtual SS block indexes for reporting.

The configuration may specify a known cell that is not the serving cell. Accordingly, the UE 110 may perform a cell search process to decode an SS block of the known cell to determine SS block timings of the known cell. For measurement of a to-be-measured neighbor cell based on SS block timings of a known cell, no cell search or SS block decoding operations are performed for the to-be-measured neighbor cell. The UE 110 may perform inter-frequency or intra-frequency measurement depending on whether a neighbor cell and a known cell are operating on a same carrier frequency.

The UE 110 may perform beam measurement to obtain beam measurements based on SSs on SS blocks. Those beam measurements may be processed before reporting to the BS 120. In addition, cell measurements can be derived based on the beam measurements. Processing of beam measurements and derivation of cell measurements can be performed in physical layer and/or RRC layer of the UE 110 in various examples.

At 1230, the UE 110 reports beam and/or cell measurement results to the BS 120. For example, the reported measurement results may be carried in an RRC message. For example, when a reporting criterion is met, a measurement report can be triggered. The report can be based on SS block indexes of a known cell. The SS block indexes can include actual SS block indexes or extended virtual SS block indexes.

In one example, when reporting beam measurement results, a number of beams having a quality above a threshold are reported. In one example, the number of reported beams is limited to be within a maximum number specified in the measurement configuration. In one example, beam measurement results and associated SS block indexes are reported together to the BS 120. In one example, only a set of associated SS block indexes are reported without providing respective beam measurement results. The set of associated SS block indexes can be arranged in an ascending or descending order in beam quality according to beam measurement results.

Figure 13:
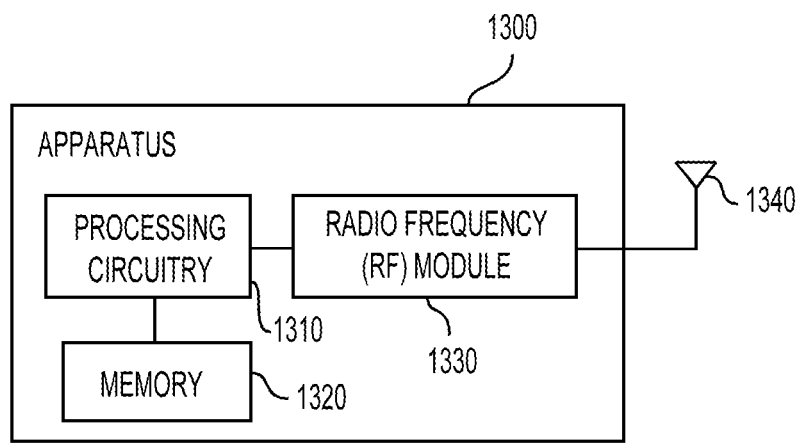
FIG. 13 shows an exemplary apparatus according to embodiments of the disclosure.

FIG. 13 shows an exemplary apparatus 1300 according to embodiments of the disclosure. The apparatus 1300 can be configured to perform various functions in accordance with one or more embodiments or examples described herein. Thus, the apparatus 1300 can provide means for implementation of techniques, processes, functions, components, systems described herein. For example, the apparatus 1300 can be used to implement functions of the UE 110 or the BS 120 or 130 in various embodiments and examples described herein. The apparatus 1300 can be a general purpose computer in some embodiments, and can be a device including specially designed circuits to implement various functions, components, or processes described herein in other embodiments. The apparatus 1300 can include processing circuitry 1310, a memory 1320, and a radio frequency (RF) module 1330.

In various examples, the processing circuitry 1310 can include circuitry configured to perform the functions and processes described herein in combination with software or without software. In various examples, the processing circuitry can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1310 can be a central processing unit (CPU) configured to execute program instructions to perform various functions and processes described herein. Accordingly, the memory 1320 can be configured to store program instructions. The processing circuitry 1310, when executing the program instructions, can perform the functions and processes. The memory 1320 can further store other programs or data, such as operating systems, application programs, and the like. The memory 1320 can include a read only memory (ROM), a random access memory (RAM), a flash memory, a solid state memory, a hard disk drive, an optical disk drive, and the like.

The RF module 1330 receives processed data signal from the processing circuitry 1310 and transmits the signal in a beam-formed wireless communication network via an antenna 1340, or vice versa. The RF module 1330 can include a digital to analog convertor (DAC), an analog to digital converter (ADC), a frequency up convertor, a frequency down converter, filters, and amplifiers for reception and transmission operations. The RF module 1330 can include multi-antenna circuitry (e.g., analog signal phase/amplitude control units) for beamforming operations. The antenna 1340 can include one or more antenna arrays.

The apparatus 1300 can optionally include other components, such as input and output devices, additional signal processing circuitry, and the like. Accordingly, the apparatus 1300 may be capable of performing other additional functions, such as executing application programs, and processing alternative communication protocols.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. A method, comprising:
receiving, by processing circuitry, a measurement configuration at a user equipment (UE) from a base station (BS) in a beam-formed system, the measurement configuration indicating that the UE can perform a measurement of a neighbor cell based on a synchronization signal block (SS block) timing of a known cell, the known cell being a serving cell of the UE, or a second neighbor cell of the UE; and
reporting, by the processing circuitry, beam measurement results of the neighbor cell using SS block indexes of the known cell.

2. The method of claim 1, wherein the measurement configuration indicates that the UE can perform the measurement of the neighbor cell based on an SS block timing relationship between the neighbor cell and the known cell.

3. The method of claim 1, wherein the measurement configuration indicates an SS block index offset between the neighbor cell and the known cell.

4. The method of claim 1, wherein the measurement configuration indicates that the UE can perform the measurement of the neighbor cell based on SS block timings of the known cell, and indicates a set of extended virtual SS block timings neighboring the SS block timings of the known cell.

5. The method of claim 1, wherein the measurement configuration indicates that the UE can perform the measurement of the neighbor cell based on a subset of SS block timings of the known cell that are evenly distributed.

6. The method of claim 1, wherein the measurement configuration indicates a set of cells including the neighbor cell, measurement of the set of cells being performed based on SS block timings of the known cell.

7. The method of claim 1, wherein the measurement configuration indicates a carrier frequency, cells operating on the carrier frequency being measured based on SS block timings of the known cell.

8. The method of claim 1, further comprising:
decoding an SS block of the known cell to obtain SS block timings of the known cell.

9. The method of claim 1, further comprising:
performing, by the processing circuitry, the measurement of the neighbor cell based on SS block signals received from the neighbor cell according to the SS block timing of the known cell.

10. The method of claim 9, wherein the performing the measurement of the neighbor cell based on the SS block signals received from the neighbor cell according to the SS block timing of the known cell comprises:
  performing the measurement of the neighbor cell without decoding an SS block of the neighbor cell to obtain SS block timings of the neighbor cell.

11. The method of claim 9, wherein the performing the measurement of the neighbor cell based on the SS block signals received from the neighbor cell according to the SS block timing of the known cell comprises:
  performing the measurement of the neighbor cell based on timings of extended virtual SS blocks of the known cell.

12. The method of claim 1, wherein the reporting beam measurement results of the neighbor cell using SS block indexes of the known cell comprises:
  reporting the beam measurement results using actual SS block indexes and/or extended virtual SS block indexes of the known cell.

13. The method of claim 1, wherein the measurement configuration is carried in a radio resource control (RRC) message or included in a system information block (SIB) broadcasted from the BS.

14. A method, comprising:
  transmitting, by processing circuitry, a measurement configuration from a base station (BS) to a user equipment (UE) in a beam-formed system, the measurement configuration indicating the UE can perform a measurement of a neighbor cell based on a synchronization signal block (SS block) timing of a known cell, the known cell being a serving cell of the UE, or a second neighbor cell of the UE; and
  receiving, by the processing circuitry, beam measurement results of the neighbor cell that are reported using SS block indexes of the known cell.

15. The method of claim 14, wherein the measurement configuration indicates that the UE can perform the measurement of the neighbor cell based on an SS block timing relationship between the neighbor cell and the known cell.

16. The method of claim 14, wherein the measurement configuration indicates an SS block index offset between the neighbor cell and the known cell.

17. The method of claim 14, wherein the measurement configuration indicates that the UE can perform the measurement of the neighbor cell based on SS block timings of the known cell and a set of extended virtual SS block timings neighboring the SS block timings of the known cell.

18. The method of claim 14, wherein the measurement configuration indicates that the UE can perform the measurement of the neighbor cell based on a subset of SS block timings of the known cell that are evenly distributed.

19. The method of claim 14, wherein the receiving the beam measurement results of the neighbor cell that are reported using the SS block indexes of the known cell comprises:
  receiving the beam measurement results of the neighbor cell that are reported using the SS block indexes of the known cell that include actual SS block indexes and/or extended virtual SS block indexes of the known cell.

20. A user equipment (UE) comprising processing circuitry configured to:
  receive a measurement configuration from a base station (BS) in a beam-formed system, the measurement configuration indicating that the UE can perform a measurement of a neighbor cell based on a synchronization signal block (SS block) timing of a known cell, the known cell being a serving cell of the UE, or a second neighbor cell of the UE; and
  report beam measurement results of the neighbor cell using SS block indexes of the known cell.

21. The method of claim 1, wherein the measurement of the neighbor cell is one of an intra-frequency measurement and an inter-frequency measurement.

22. The method of claim 14, wherein the measurement of the neighbor cell is one of an intra-frequency measurement and an inter-frequency measurement.

* * * * *